Sept. 3, 1968  C. E. WHITE  3,399,881
VIBRATION DAMPENED SPRING UNIT
Filed Feb. 13, 1967

CHARLES E. WHITE
INVENTOR.

BY John R. Faulkner
William E. Johnson

ATTORNEYS

United States Patent Office 3,399,881
Patented Sept. 3, 1968

3,399,881
VIBRATION DAMPENED SPRING UNIT
Charles E. White, Allen Park, Mich., assignor to Ford
Motor Company, Dearborn, Mich., a corporation of
Delaware
Filed Feb. 13, 1967, Ser. No. 615,523
4 Claims. (Cl. 267—1)

ABSTRACT OF THE DISCLOSURE

A thin, deformable member having a width slightly greater than the internal diameter of a cylindrical coil spring is positioned within the spring in a transversely bowed configuration. In this configuration, respective side edges of the deformable member engage inner surface portions of the turns of wire forming the spring and function to dampen the vibrations and thereby decrease the acoustical energy output of the extension spring as the latter is flexed lengthwise.

Background of the invention

Many attempts have been made to decrease the acoustical energy output of a cylindrical coil spring which is produced when the spring is rapidly expanded and contracted in a lengthwise direction. The "twang" or "singing spring" effect produced by rapid expansion and contraction of a spring is distracting and this is particularly true in the case of a door latch mechanism for an automobile door. More particularly, when an extension spring of an automotive door latch mechanism produces a "twang," the cavity of the door acts as a resonating chamber and magnifies the sound produced. The physical vibrations of the door panels can be felt and are audible in parts of the vehicle remote from the offending spring.

Attempts have been made to eliminate or substantially reduce the acoustical energy output of an extension spring. For example, an attempt has been made to eliminate the "twang" of an extension spring by applying a coating over the outside surface of the spring. Coatings such as paint or plastic have been sprayed on the extension spring but these coatings, in general, are difficult and expensive to apply and do not produce a satisfactory result as the spring still has a tendency to "twang" when rapidly expanded and contracted.

The present invention provides a unique vibration dampener having none of the disadvantages of the coating method of acoustical energy suppression.

Summary of the invention

A vibration dampened spring unit of this invention comprises a plurality of turns of spring wire coiled about an axis to define a cylindrical coil spring of predetermined internal diameter. A relatively thin, deformable member having a width slightly greater than the diameter of the spring is positioned within the spring in a transversely bowed configuration. Respective side edges of the deformable member are in engagement with inner surface portions of the turns of wire coiled about the axis so that as the spring is rapidly expanded and contracted the member will dampen the vibrations thereof to decrease the acoustical energy output of the spring.

In a preferred embodiment of the vibration dampened spring unit of this invention, the relatively thin, deformable member is slightly longer than the length of the spring and has outwardly extending projections on the ends thereof extending beyond the length of the spring. These outwardly extending projections insure the retention of the deformable member within the spring no matter what application the spring is utilized in.

The utilization of the vibration dampened spring unit of this invention substantially reduces the acoustical energy output associated with expansion and contraction of cylindrical coil springs which are placed under load by being extended. The spring unit is economical to manufacture and effective in operation to reduce substantially the noise level associated with operation of an extension spring. More specifically, the vibration dampened spring unit of this invention significantly reduces the acoustical energy output associated with the operation of an extension spring in a door latch mechanism of an automobile vehicle.

Description of the preferred embodiment

In the description of the preferred embodiment of the vibration dampened spring unit of this invention, the spring unit will be described as being utilized in a door latch mechanism of an automobile. It should be understood, however, that this particular use of the vibration dampened spring unit of this invention is merely illustrative and that the spring unit may be utilized in many other applications.

Figure 1:
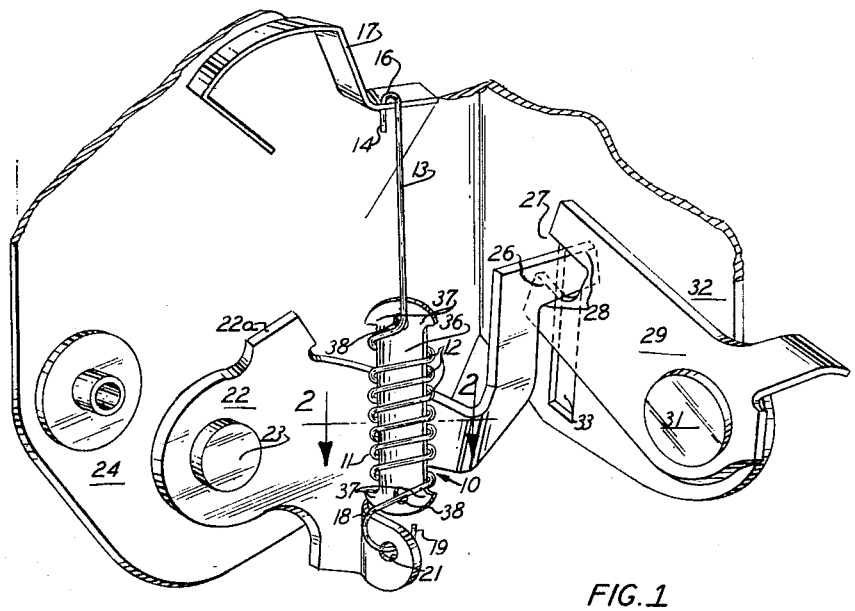
FIGURE 1 is a perspective view of the vibration dampened spring unit of this invention as employed in a door latch mechanism of an automobile.

Referring now to the drawings and, more particularly, to FIGURE 1, there is shown therein a vibration dampened spring unit, generally designated by the numeral 10. The spring unit 10 is shown as utilized in conjunction with a door latch mechanism of an automobile. More specifically, a spring portion 11 of the spring unit 10 is formed of a plurality of turns 12 of spring wire. The turns 12 of wire terminate at one end in an elongated length 13 of wire which has a hook end 14 thereof received in an opening 16 of a retainer 17. The turns of wire terminate at the other end in a length 18 of wire which has a hook end 19 received in an opening 21 of a door latch pawl 22.

The door latch pawl 22 is pivotable about a pivot pin 23 which secures the pawl to a supporting member 24. The door latch pawl 22 has an abutment 22a releasably engageable with a latch device (not shown) for holding the latter in door latched position. The nature of the latch device of the latch mechanism forms no part of the present invention. (A typical latch mechanism is shown in U.S. Patent 3,231,302; issued Jan. 25, 1966, to M. M. Westerdale.) The pawl 22 has a projecting portion 26 thereof which is received in an opening 27 between a bifurcated portion 28 of an operating lever 29 of a stand ard door latch mechanism. The operating lever 29 is pivotable about a pivot pin 31 which secures the lever to a support wall 32. A part of the projecting portion 26 of the door latch pawl 22 extends through a slot 33 in the support wall 32, the slot 33 guiding the projection 26 as the pawl 22 is actuated.

As is understood by those skilled in the art, when the operating lever 29 of the door latch mechanism is pivoted in a clockwise direction about pivot pin 31, the projecting portion 26 of the door latch pawl 22 is moved down in the opening 33 in the support wall 32 to release the latch device (not shown). This movement causes the spring portion 11 of the vibration dampened spring unit 10 to expand. As soon as the latch device is released, the spring rapidly contracts. This rapid contraction of the spring will produce harmonic vibrations which produce an acoustical energy output such as a "twang." More particularly, when an extension spring is utilized without any dampening element, the spring will vibrate and will produce an acoustical energy output in the door of the automobile. Since the door of an automobile acts as a resonating chamber, the noise produced by the vibrations of the spring is fortified and becomes even more objectionable than the simple "twang" of the spring.

Figure 2:
FIGURE 2, taken along line 2—2 of FIGURE 1, is a plan view showing the spring unit in cross section.
Figure 3:
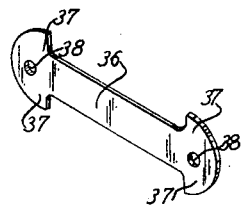
FIGURE 3 is a perspective view which shows one embodiment of the deformable member utilized with the spring unit.

To eliminate this objectionable noise, the vibration dampened spring unit 10 of this invention includes as an integral part thereof a relatively thin, deformable member 36. The member 36, as best seen in FIGURES 2 and 3, is formed such that its width is slightly larger than the internal diameter of the spring portion 11 of the spring unit 10. As a result of being slightly larger in width than the diameter of the spring portion, the relatively thin, deformable member 36 assumes a transversely bowed configuration when inserted into the spring (see FIGURE 2).

Figure 4:
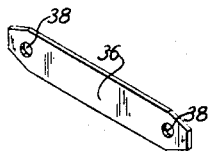
FIGURE 4 is a perspective view which shows another embodiment of the deformable member utilized with the spring unit.

In the preferred embodiment of the deformable member 36, as shown in FIGURES 1 and 3, the member is slightly longer than the length of the coiled turns of wire 12. Opposite ends of the deformable member 36 have outwardly extending projections 37 thereon which retain the member 36 within the spring portion 11 of the spring unit 10. However, in some applications it is not necessary to employ the extending projections 37 on the member 36. The member 36, shown in FIGURE 4 does not carry such projections.

The deformable member 36 has openings 38 in opposite ends thereof. These openings 38 are utilized in one method of inserting the deformable member 36 into the spring portion 11 of the spring unit 10. More particularly, a tool having a long wire member with a hook on the end thereof is inserted through the central portion of the spring unit 10 and the hook end of the tool is slipped into an opening 38 of the deformable member 36. The tool is pulled upwardly through the central portion of the spring 11 thereby drawing the deformable member 36 into the central portion of the spring unit 10 to assume an assembled position wherein it is in a bowed configuration.

The theory of operation of the vibration dampened spring unit of this invention is as follows. When the spring portion 11 of the spring unit 10 is expanded and then allowed to contract, a harmonic vibration is set up in the spring which results in an acoustical energy output therefrom. When the deformable member 36 is positioned within and engaging inner surface portions of the turns 12 of wire of the spring portion 11 of the spring unit 10, the deformable member 36 absorbs the vibrational energy of the spring and thereby eliminates the acoustical energy output of the spring. Elimination of the acoustical energy output of the spring unit by the spring vibration dampened spring unit of this invention results in a substantially quieter actuation of mechanisms associated therewith such as the door latch mechanism of an automobile.

The spring vibration dampened member 36 is preferably made from a polyester film of a thickness sufficient to permit the member to retain its transversely bowed configuration when inserted in a spring. However, many materials are suitable for use as the deformable member so long as such material may be deformed and will absorb vibrational energy. For example, a thin piece of cardboard may be utilized as the deformable member.

There has been disclosed herein a vibration dampened spring unit which is economical to manufacture and which substantially reduces the acoustical energy output of a cylindrical coil spring upon rapid expansion and contraction of the spring.

What is claimed is:

1. A vibration dampened spring unit which comprises a plurality of turns of spring wire coiled about an axis to define a spring of a predetermined internal diameter, and a relatively thin, deformable member having a width slightly greater than the internal diameter of said spring and positioned within said spring in a bowed configuration with respective side edges in engagement with portions of said turns of wire coiled about said axis so that as said spring is expanded and contracted, said member will dampen the vibrations to decrease the acoustical energy output of said spring.

2. A vibration dampened spring unit which comprises a plurality of turns of spring wire coiled about an axis to define a cylindrical coil extension spring of a predetermined internal diameter and length, and a relatively thin, deformable member having a width slightly greater than the internal diameter of said extension spring and a length slightly greater than the length of said extension spring, said deformable member being positioned within said spring in a transversely bowed configuration with respective side edges thereof in engagement with respective inner surface portions of said turns of wire coiled about said axis so that as said extension spring is rapidly expanded and contracted, said member will dampen the vibrations to decrease the acoustical energy output of said extension spring.

3. The vibration dampened spring unit defined in claim 2 wherein said deformable member has outwardly extending projections on the portions thereof extending beyond the length of said spring to retain said member within said spring.

4. The spring unit defined in claim 3 wherein the ends of said deformable member extending beyond said spring also have openings therein, which openings are utilized in assembling said member and said spring.

References Cited

UNITED STATES PATENTS

| | | | |
|---|---|---|---|
| 1,863,580 | 6/1932 | Myers | 267—1 |
| 2,822,568 | 2/1958 | Hosea | 267—1 |

ARTHUR L. LA POINT, *Primary Examiner.*

R. M. WOHLFARTH, *Assistant Examiner.*